United States Patent
Yuen et al.

(10) Patent No.: US 12,380,170 B2
(45) Date of Patent: Aug. 5, 2025

(54) PERFORMANCE OPTIMIZATIONS FOR ROW-LEVEL SECURITY FILTERS

(71) Applicant: Google LLC, Mountain View, CA (US)

(72) Inventors: Jonah Tang Soon Yuen, Sunnyvale, CA (US); Mosha Pasumansky, Mountain View, CA (US); Kwanho Ryu, Mountain View, CA (US); Daniel Thurman Asheghian, Los Gatos, CA (US); Aleksandras Surna, Redmond, WA (US); Thibaud Baptiste Hottelier, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/457,227

(22) Filed: Dec. 1, 2021

(65) Prior Publication Data
US 2023/0169121 A1   Jun. 1, 2023

(51) Int. Cl.
*G06F 16/9035* (2019.01)
*G06F 16/9032* (2019.01)
*G06F 21/62* (2013.01)

(52) U.S. Cl.
CPC ...... *G06F 16/9035* (2019.01); *G06F 16/9032* (2019.01); *G06F 21/6227* (2013.01)

(58) Field of Classification Search
CPC ............. G06F 16/9035; G06F 16/9032; G06F 21/6227
See application file for complete search history.

(56) References Cited

U.S. PATENT DOCUMENTS 8,306,999 B2 * 11/2012 Gass, III ............ G06F 21/6227
707/802
2005/0177570 A1    8/2005 Dutta et al.
2008/0071785 A1 *  3/2008 Kabra ............... G06F 16/24547
707/999.009

(Continued)

FOREIGN PATENT DOCUMENTS

WO    WO-2014074961 A2 *  5/2014 ....... G06F 17/30507

OTHER PUBLICATIONS

International Search Report and Written Opinion for the related Application No. PCT/US2022/080275, dated Mar. 22, 2023, 103 pages.

(Continued)

*Primary Examiner* — Ann J Lo
*Assistant Examiner* — Fernando M Mari Valcarcel
(74) *Attorney, Agent, or Firm* — Shumaker & Sieffert, P.A.

(57) ABSTRACT

A method for optimizing a database query includes receiving a database query from a user requesting a database to conditionally return one or more rows stored at the database and characterizing one or more user filters. Each user filter filters rows from the database. The method includes determining that a security filter restricts the user from accessing one or more rows of the database. For each respective user filter, the method includes classifying the respective user filter as a safe user filter incapable of reporting an error or an unsafe user filter capable of reporting an error. The method also includes determining a filter execution order of the one or more user filters and the security filter based on the classified one or more user filters and executing, using the determined filter execution order, the one or more user filters and the security filter.

18 Claims, 5 Drawing Sheets

(56) References Cited

U.S. PATENT DOCUMENTS

| | | | | |
|---|---|---|---|---|
| 2011/0055197 A1* | 3/2011 | Chavan | ............... | G06F 16/2454 |
| | | | | 707/E17.017 |
| 2013/0238659 A1* | 9/2013 | Roitman | ............. | G06F 21/6227 |
| | | | | 707/E17.001 |
| 2017/0293676 A1* | 10/2017 | Lowe | .................... | G06F 16/245 |
| 2019/0340283 A1* | 11/2019 | Schneider | ........... | G06F 16/2428 |
| 2021/0286893 A1 | 9/2021 | Lee et al. | | |
| 2021/0357398 A1* | 11/2021 | Balakavi | ........... | G06F 16/24578 |

OTHER PUBLICATIONS

Response to Communication Pursuant to Rules 161(1) and 162 EPC dated Jun. 10, 2024, from counterpart European Application No. 22834818.1, filed Jan. 9, 2025, 50 pp.

* cited by examiner

PERFORMANCE OPTIMIZATIONS FOR ROW-LEVEL SECURITY FILTERS

TECHNICAL FIELD

This disclosure relates to performance optimizations for row-level security filters.

BACKGROUND

Row-level security filtering is a common technique employed to vary database query results based on who is making the query. When a database system (such as a cloud database storage system) receives a database query from a user, the database system may apply one or more row-level security filters to the database query. The security filters restrict the user from retrieving or interacting with data (i.e., rows) filtered or protected by the security filters. For example, a security filter restricts database queries from a particular user to only rows from a single region associated with the particular user such that the particular user cannot return rows associated with other regions.

SUMMARY

One aspect of the disclosure provides a computer-implemented method that when executed by data processing hardware causes the data processing hardware to perform operations. The operations include receiving a database query from a user. The database query requests a database to conditionally return one or more data blocks stored at the database. The database may be stored on memory hardware in communication with the data processing hardware. The database query characterizes one or more user filters that each filter rows from the database. The method includes determining that a security filter restricts the user from accessing at least one row of the database. For each respective user filter of the one or more user filters, the method includes classifying the respective user filter as one of a safe user filter incapable of reporting an error or an unsafe user filter capable of reporting an error. The method also includes determining a filter execution order of the one or more user filters and the security filter based on the classified one or more user filters and executing, using the determined filter execution order, the one or more user filters and the security filter.

Implementations of the disclosure may include one or more of the following optional features. In some implementations, the database query includes a Structured Query Language (SQL) query. Optionally, determining the filter execution order includes placing the security filter earlier in the filter execution order than each respective user filter of the one or more user filters classified as the unsafe user filter.

In some examples, determining the filter execution order includes placing at least one of the one or more user filters classified as the safe user filter earlier in the filter execution order than the security filter. Classifying the respective user filter as the safe filter may include determining that the respective user filter comprises a comparison filter. Classifying the respective user filter as the unsafe user filter may include determining that the respective user filter comprises a division operation.

In some implementations, classifying the respective user filter as a safe filter includes determining the respective user filter includes an unsafe user filter, determining the respective user filter has an equivalent safe user filter, and translating the respective user filter to the equivalent safe user filter. In these implementations, the equivalent safe user filter may return a NULL.

In some examples, the operations further include extracting, from the database query, the one or more user filters using conjunctive-normalized forms. Classifying the respective user filter comprises referencing an allowlist.

Another aspect of the disclosure provides data processing hardware and memory hardware in communication with the data processing hardware. The memory hardware stores instructions that when executed on the data processing hardware cause the data processing hardware to perform operations. The operations include receiving a database query from a user. The database query requests a database to conditionally return one or more data blocks stored at the database. The database may be stored on the memory hardware. The database query characterizes one or more user filters that each filter rows from the database. The method includes determining that a security filter restricts the user from accessing at least one row of the database. For each respective user filter of the one or more user filters, the method includes classifying the respective user filter as one of a safe user filter incapable of reporting an error or an unsafe user filter capable of reporting an error. The method also includes determining a filter execution order of the one or more user filters and the security filter based on the classified one or more user filters and executing, using the determined filter execution order, the one or more user filters and the security filter.

This aspect may include one or more of the following optional features. In some implementations, the database query includes a Structured Query Language (SQL) query. Optionally, determining the filter execution order includes placing the security filter earlier in the filter execution order than each respective user filter of the one or more user filters classified as the unsafe user filter.

In some examples, determining the filter execution order includes placing at least one of the one or more user filters classified as the safe user filter earlier in the filter execution order than the security filter. Classifying the respective user filter as the safe filter may include determining that the respective user filter comprises a comparison filter. Classifying the respective user filter as the unsafe user filter may include determining that the respective user filter comprises a division operation.

In some implementations, classifying the respective user filter as a safe filter includes determining the respective user filter includes an unsafe user filter, determining the respective user filter has an equivalent safe user filter, and translating the respective user filter to the equivalent safe user filter. In these implementations, the equivalent safe user filter may return a NULL.

In some examples, the operations further include extracting, from the database query, the one or more user filters using conjunctive-normalized forms. Classifying the respective user filter comprises referencing an allowlist.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
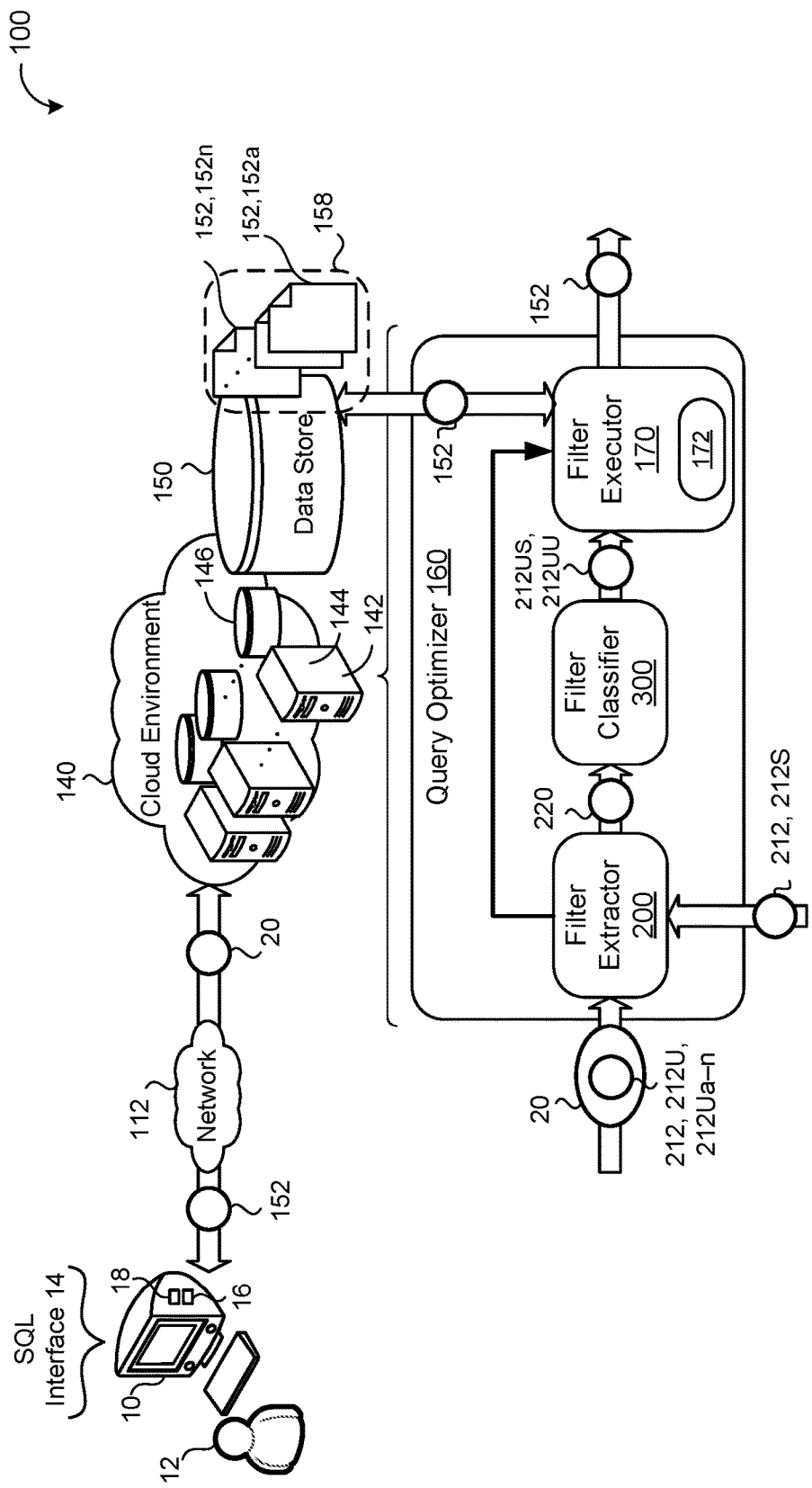
FIG. 1 is a schematic view of an example system for optimizing database queries.

Row-level security filtering is a common technique employed to vary database query results based on who is making the query. In a database/data warehousing system, row-level security refers to the ability to control access to individual rows in a database table. When a database system (such as a cloud database storage system) receives a database query from a user, the database system may apply one or more security filters (i.e., row filters) to the database query. The security filters restrict the user from retrieving or interacting with data (i.e., rows) filtered or protected by the security filters. For example, a security filter restricts database queries from a particular user to only a single region associated with the particular user such that the particular user cannot return data from other regions.

Thus, row filters are a technique for enforcing row-level security. Specifically, row filters map a group of end-user principals to a subset of rows of data in a database or table. This subset may be defined by a Structured Query Language (SQL) expression (e.g., "Region='US'") or other similar syntax. When an end-user executes a query against a table, the database system may first check if any row filters apply to the querying user. Then, all applicable row filters are typically appended as additional user filters (e.g., to the WHERE clause of an SQL query).

However, row-level security filters suffer from the possibility of error messages "leaking" information about restricted rows (i.e., rows that the security filter is designed to restrict the user from accessing). Malicious users may probe database systems for these error messages to leak or reveal information from protected rows. For example, the SQL query "SELECT*FROM table WHERE 1/(salary−60000)=1" includes the user filter "1/(salary−60000)=1." For this particular user filter, if there is a row in the database that has a salary value of 60,000, the user filter causes a "divide by zero" error. If, in this example, the user had a row security filter that limited the user to only viewing rows where the salary is less than 50,000, the divide by zero error would indicate to the user that a row with a salary greater than 50,000 exists (i.e., that a salary of 60,000 exists).

It is apparent that such a vulnerability could be further exploited through repeated queries and observing the corresponding error messages. For instance, continuing the previous example, a malicious user could craft a query such as "SELECT*FROM table WHERE 1/(salary−$X)=1" and repeatedly execute the query with increasing values of X, observing that every time an error message results, the value for X exists in the table.

A naive solution to this problem is to ensure that the row filter executes prior to any user filters. While this ensures that error messages will not leak from restricted rows (because the rows will be filtered prior to any user filter executing), this leads to sub-optimal query execution. Query engines often rearrange an order of operations of the user filters to optimize the query (e.g., minimize query latency) without altering the query results. For example, a query engine first executes filters that remove the largest number of rows, thereby reducing the intermediate result set and allowing subsequent filters to execute faster (as there are less rows to process). By forcing row filters to execute first, query engines are denied the opportunity to fully optimize the query, thus leading to degradation of performance. That is, by executing row filters first (i.e., by disabling optimizations), the query is effectively compartmentalized into row filters and user filters and any optimization that may be achieved from observing the entirety of the query filters as whole is lost. Thus, it is advantageous to increase a number of user filters that can be executed prior to the row-level security filter to provide the query optimizer with more flexibility in optimizing the query (e.g., for query speed and/or size of disk operations).

Implementations herein provide systems and methods for a query optimizer that enforces row level security filters while providing more optimization capabilities than other naive implementations. The query optimizer splits or divides the user filters into a "safe" user filter set and an "unsafe" user filter set. Safe user filters cannot result in an error that leaks information while unsafe user filters may result in an error that leaks information. The query optimizer ensures that the row level security filter executes prior to the unsafe user filters, but freely optimizes the queries using the safe user filters.

Referring to FIG. 1, in some implementations, a database query optimizer system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of data blocks 152, 152a—n within one or more databases or tables 158, 158a—n (i.e., a cloud database). As used herein, data blocks 152 may interchangeably be referred to as rows 152 (i.e., rows of a table or database 158). The data store 150 may store any number of tables 158 at any point in time.

The remote system 140 is configured to receive a database query 20 (i.e., a request) from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the database query 20 using a Structured Query Language (SQL) interface 14, although other interfaces are contemplated. The database query 20 requests the remote system 140 to query one or more of the databases 158 to conditionally return one or more data blocks 152 stored at the queried databases 158. As discussed in more detail below, the database query 20 includes (explicitly or implicitly) one or more user filters 212, 212U, 212Ua-n that characterize the database query 20.

The remote system 140 executes a query optimizer 160 that receives the database query 20. The query optimizer 160 includes a filter extractor 200. The filter extractor 200 determines whether a security filter 212, 212S (i.e., a row-level security filter) restricts the user 12 (or a user account or user device 10) associated with the database query 20 from accessing (i.e., reading or writing) one or more rows of the queried database 158. While examples herein illustrate a single security filter 212S, it is understood that any number of security filters 212S are applicable to database queries 20. The filter extractor 200 may determine the presence of the security filter 212S associated with the user 12 using any conventional means (e.g., querying a table or database, querying a remote entity, parsing metadata, etc.).

Figure 2:
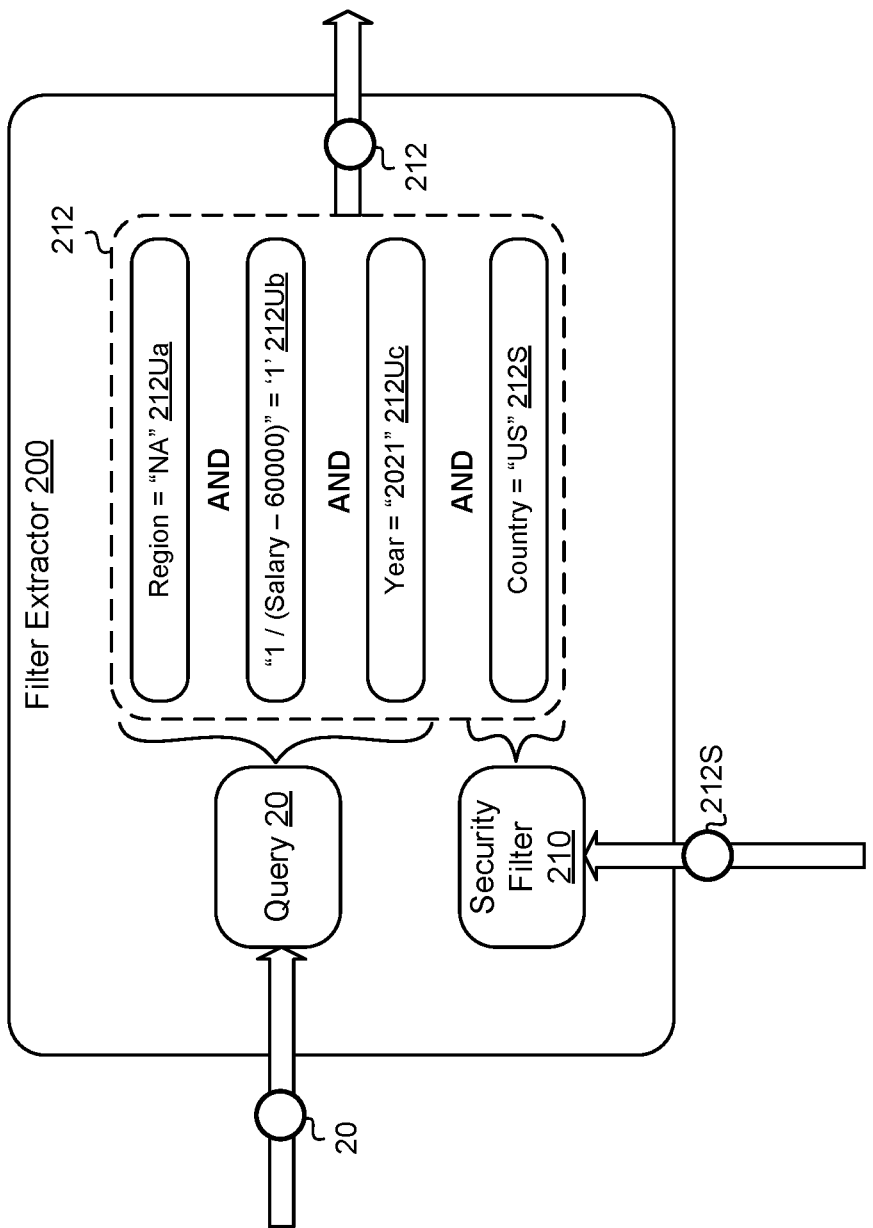
FIG. 2 is a schematic view of exemplary components of the system of FIG. 1.

Referring now to FIG. 2, the filter extractor 200 (e.g., when the filter extractor 200 determines that the security filter 212S applies to the user 12), extracts the one or more user filters 212U from the database query 20. The user filters 212U each represent a portion or component of the database query 20 such that, when each user filter 212U is executed using a logical AND with each other user filter 212U (e.g., a conjunctive-normalized form), the user filters 212U combine to return the rows 152 requested by the database query 20. In the illustrated example, the database query 20 requests all rows 152 (i.e., data blocks 152) that include values where the region (i.e., a column representing region) is equal to "NA", all rows 152 where "1/(Salary−60000)=1" for a salary column is true, and where a year column is equal to "2021." In this example, the filter extractor 200 extracts three user filters 212U$a$-$c$. A first user filter 212U$a$ represents "Region='NA', a second user filter 212U$b$ represents '1/(Salary−60000)'='1'", and a third user filter 212U$c$ represents "Year='2021'". Thus, to properly execute the database query 20 (and return the proper rows to the user 12), only rows 152 where all three user filters 212U$a$-$c$ evaluate to true should be returned. Thus, by logically ANDing the user filters 212U$a$-$c$, the query optimizer 160 will properly evaluate the database query 20.

Similarly, the security filter 212S is logically ANDed with the user filters 212U$a$-$c$ to further restrict the rows 152 of the queried database 158 that can be returned to the user 12. Here, the security filter 212S restricts the user 12 to rows 152 that include a country value of "US." That is, in this example, the user is only authorized to retrieve rows 152 where a country value is equal to "US." That is, when a row 152 satisfies all three of the user filters 212U$a$-$c$, but the row does not satisfy the security filter 212S, the row 152 will not be returned to the user 12. The filter extractor 200 may return the list or group of filters 212.

Referring back to FIG. 1, the query optimizer 160 includes a filter classifier 300. The filter classifier receives the group of filters 212 from the filter extractor 200. The filter classifier 300, for each user filter 212U, classifies the respective user filter 212U as a safe user filter 212US or an unsafe user filter 212UU. Safe user filters 212US are defined as user filters 212U incapable of resulting in an error that leaks information, while unsafe user filters 212UU are defined as user filters 212U capable of resulting in an error that leaks information.

Figure 3:
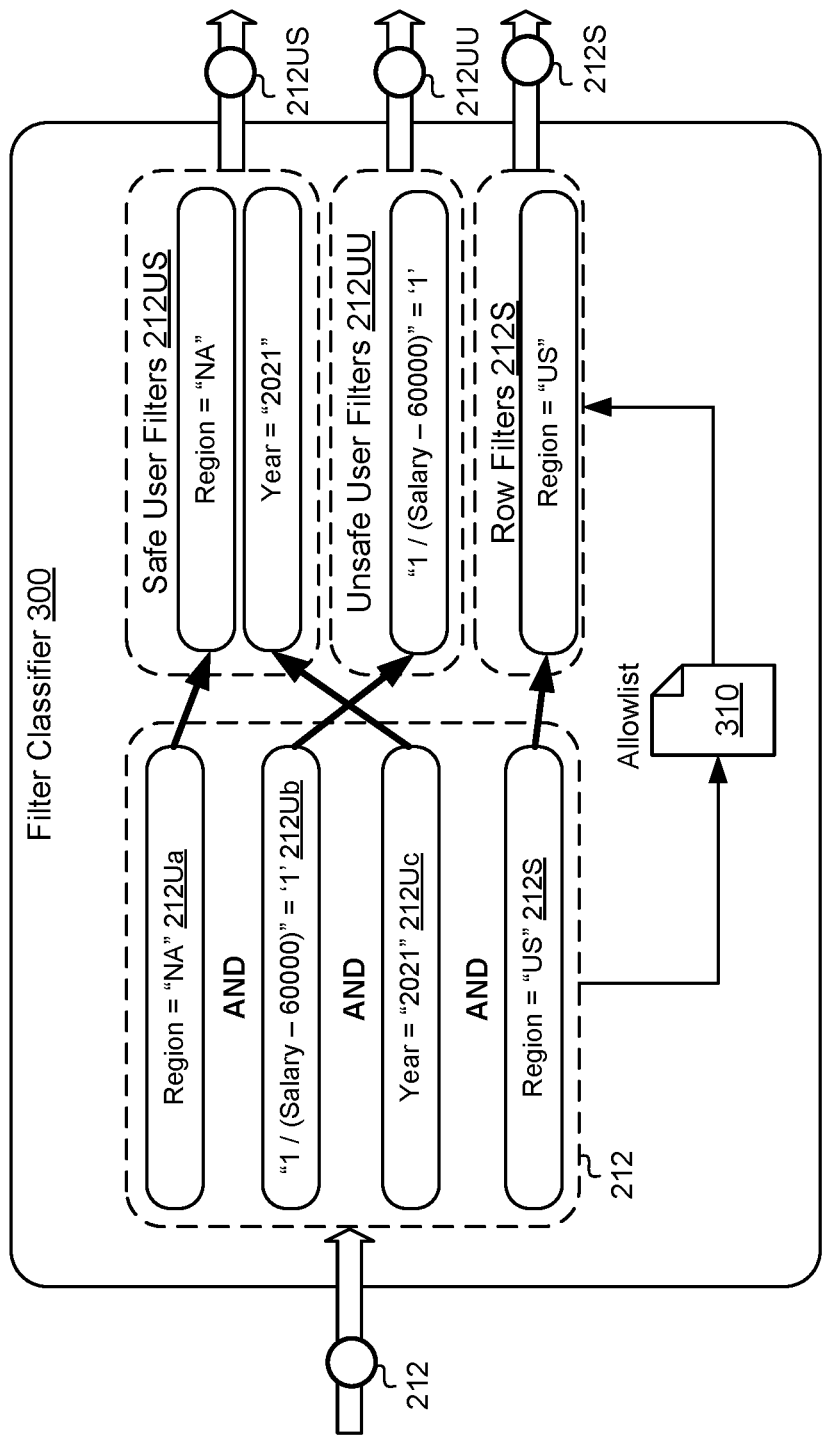
FIG. 3 is a schematic view of additional exemplary components of the system of FIG. 1.

Referring now to FIG. 3, and continuing with the example of FIG. 2, the filter classifier 300 receives the filters 212 that includes the three user filters 212U$a$-$c$ and the security filter 212S. The filter classifier 300 classifies each user filter 212U$a$-$c$ as either a safe user filter 212US or an unsafe user filter 212UU. Safe user filters 212US are user filters 212U that cannot result in an error that leaks information back to a user 12. For example, constant comparisons (e.g., comparison filters) where a constant value is compared to the value within a column (e.g., column=constant, column>=constant, column<=constant, column<constant) is considered a safe user filter 212US because no matter the constant value or the column value, the comparison will not result in an error that leaks information. Here, the filter classifier 300 classifies the first user filter 212U$a$ (i.e., Region="NA") and the third user filter 212U$c$ (i.e., Year="2021") as safe user filters 212US, as both of these user filters 212U$a$, 212U$c$ are constant comparisons that are accordingly safe.

In contrast to safe user filters 212US, unsafe user filters 212UU are user filters 212U that are capable of producing an error that leaks information. For example, division operations are unsafe user filters 212UU, as division operations can result in a divide by zero error, which could provide information to the user 12 about existence of values within rows the user 12 should be restricted from accessing based on the security filter 212S. Here, the filter classifier 300 classifies the second user filter 212U$b$ as an unsafe user filter 212UU because the second user filter 212U$b$ includes a division operation (i.e., "Salary−60000") which could result in a divide by zero error. For example, when a row has a salary value of 60,000, the divisor (i.e., (60000−60000)) is equal to zero. A divide by zero error, when reported to the user 12, may reveal existence of information within restricted rows 152 of the database.

To classify the user filters 212U, the filter classifier 300, in some examples, references an allowlist 310. The allowlist 310 may include a list of safe user filters 212US and/or unsafe user filters 212UU. The allowlist 310 may be split into two separate lists (i.e., a list for safe user filters 212US and a list for unsafe user filters 212UU). The filter classifier 300 may use any other means of classifying the user filters 212U, such as via a model (e.g., a machine learning model). The filter classifier 300, when unable to conclusively determine whether a user filter 212U is safe or unsafe, may default to classifying the user filter 212U as unsafe. The filter classifier 300 may update the allowlist 310 or equivalent in response to determining that a user filter 212U returns an error (e.g., adding or deleting an entry from the allowlist 310).

In some implementations, the filter classifier 300, when classifying the user filters 212U, determines a respective user filter 212U is an unsafe user filter 212UU and determines that the unsafe user filter 212UU has an equivalent safe user filter 212US. In this scenario, the filter classifier 300 may translate the respective user filter 212U (which is unsafe) to the equivalent safe user filter 212US. For example, a particular database implementation may have an alternate division operator that returns NULLs instead of divide by zero errors (e.g., a SAFE DIVIDE operation). In this example, the filter classifier 300 may further determine whether or not the user filter 212U includes an "IS NULL" operator to ensure that the user 12 is not maliciously hunting for NULLs (and thereby extracting restricted information from the database 158). It is understood that examples of safe user filters 212US and unsafe user filters 212SS are not limiting in any way and that lists of safe and unsafe user filters 212U may vary based on specific database implementations.

Referring back to FIG. 1, the filter classifier 300 provides the classified safe user filters 212US and unsafe user filters 212UU to a filter executor 170. The filter executor 170 also receives the security filter 212S (e.g., from the filter extractor 200 or the filter classifier 300). The filter executor 170 determines a filter execution order 172 172 for the user filters 212U (i.e., the safe user filters 212US and the unsafe user filters 212UU) and the security filter 212S. That is, the filter executor 170 determines an optimal (e.g., fastest) order in executing the filters 212 that will also ensure that unsafe filters 212UU do not leak information via error messages. For example, the filter executor 170 ensures that the security filter 212S is earlier in the filter execution order 172 than each unsafe user filter 212UU so to ensure restricted rows 152 are filtered before any potential error messages can be propagated back to the user 12. The filter executor 170 may otherwise be free to optimize the ordering of the safe user filters 212US and the security filter 212S. For example, the filter executor 170 places at least one safe user filter 212US earlier in the filter execution order 172 than the security filter 212S. That is, the filter executor 170 may execute the user filters 212U and the security filter 212S in any order as long as the security filter 212S executes prior to the unsafe user filters 212UU.

The filter executor 170 executes, using the filter execution order 172, each of the filters 212 (i.e., the security filter 212S, the safe user filters 212US, and the unsafe user filters 212UU) to retrieve one or more rows 152 for the user 12. The query optimizer 160 may return the retrieved rows 152 to the user 12.

Thus, the query optimizer 160 allows a database system 100 to implement row-level security filters 212S without error-message vulnerabilities while still maintaining some optimization flexibility. That is, the query optimizer 160 may generate a more efficient filter execution order 172 based on the classifications of the safe user filters 212US and the unsafe user filters 212UU, than a naive implementation that merely executes the security filter 212S first. The query optimizer 160 may execute as part of a cloud database system 100 that is remote from one or more users 12 of the system 100.

Figure 4:
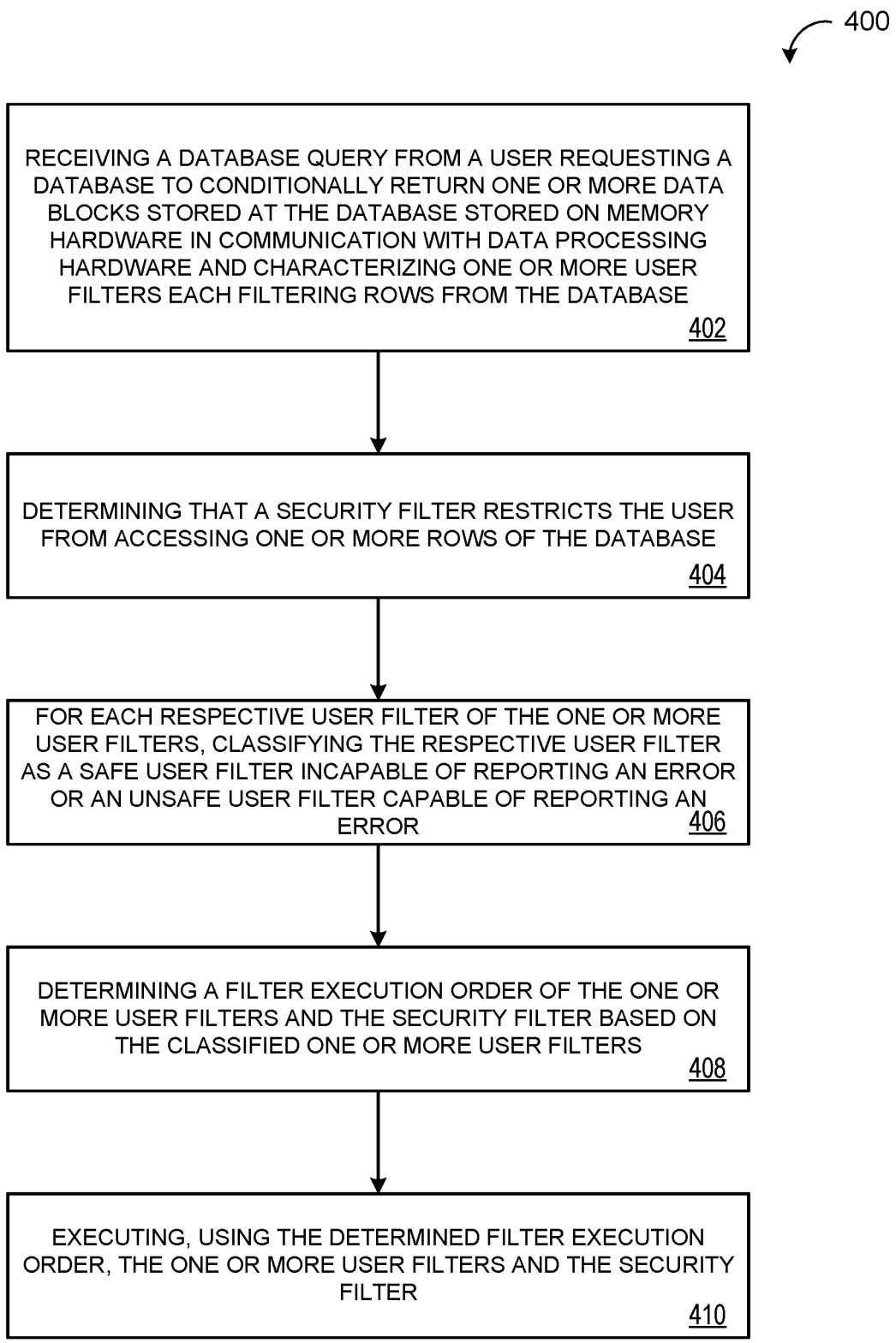
FIG. 4 is a flowchart of an example arrangement of operations for a method of optimizing a database query using row-level security filters.

FIG. 4 is a flowchart of an exemplary arrangement of operations for a method 400 that, when executed by data processing hardware 144, causes the data processing hardware to perform operations. At operation 402, the method 400 includes receiving a database query 20 from a user 12. The database query 20 requests a database 158 to conditionally return one or more rows 152 stored at the database 158. The database 158 is stored on memory hardware 142 in communication with the data processing hardware 148. The database query characterizes one or more user filters 212U. Each user filter 212U of the one or more user filters 212U filters rows 152 from the database 158.

The method 400, at operation 404, includes determining that a security filter 212S restricts the user 12 from accessing one or more rows 152 of the database 158. At operation 406, the method 400 includes, for each respective user filter 212U of the one or more user filters 212U, classifying the respective user filter 212U as a safe user filter 212US incapable of reporting an error or an unsafe user filter 212UU capable of reporting an error. At operation 408, the method 400 includes determining a filter execution order 172 of the one or more user filters 212U and the security filter 212S based on the classified one or more user filters 212US, 212UU. At operation 410, the method 400 includes executing, using the determined filter execution order 172, the one or more user filters 212U and the security filter 212S.

Figure 5:
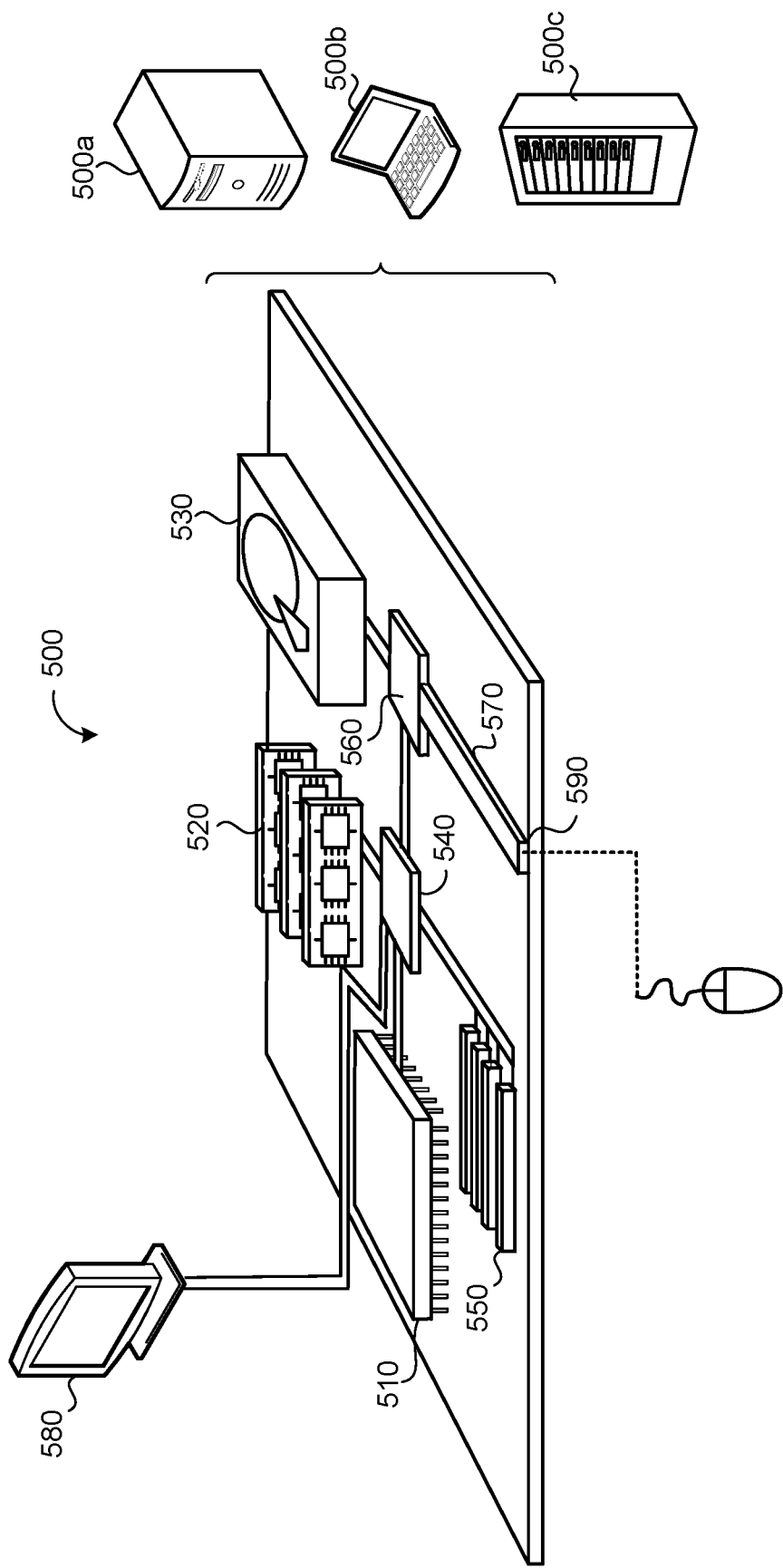
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving, via a network, a database query from a user device associated with a user, the database query requesting a database to conditionally return one or more rows stored at the database, the database query characterizing multiple user filters, each user filter of the multiple user filters filtering rows from the database;
   determining that a security filter restricts the user from accessing at least one row of the database;
   for each respective user filter of the multiple user filters, classifying the respective user filter as one of:
      a safe user filter representing a user filter that, when executed, is incapable of reporting an error that leaks information from the at least one row of the database; or
      an unsafe user filter representing a user filter that, when executed, is capable of reporting an error that leaks information from the at least one row of the database;
   determining a filter execution order of the multiple user filters and the security filter based on the classified multiple user filters, the filter execution order ensuring no errors leak information from the at least one row of the database;
   optimizing the filter execution order to minimize query latency while ensuring no errors leak information from the at least one row of the database, wherein optimizing the filter execution order comprises:
placing at least one of the respective user filters classified as the safe user filter earlier in the filter execution order than the security filter; and
placing each of the respective user filters classified as the unsafe user filter later in the filter execution order than the security filter;
executing, using the optimized filter execution order, the multiple user filters and the security filter; and
returning, via the network, the one or more rows to the user device.

2. The method of claim 1, wherein the database query comprises a Structured Query Language (SQL) query.

3. The method of claim 1, wherein classifying the respective user filter as the safe user filter comprises determining that the respective user filter comprises a comparison filter.

4. The method of claim 1, wherein classifying the respective user filter as the unsafe user filter comprises determining that the respective user filter comprises a division operation.

5. The method of claim 1, wherein classifying the respective user filter as the safe user filter comprises:
determining the respective user filter comprises the unsafe user filter;
determining the respective user filter has an equivalent safe user filter; and
translating the respective user filter to the equivalent safe user filter.

6. The method of claim 5, wherein the equivalent safe user filter returns a NULL.

7. The method of claim 1, wherein the operations further comprise extracting, from the database query, the multiple user filters using conjunctive-normalized forms.

8. The method of claim 1, wherein classifying the respective user filter comprises referencing an allowlist.

9. The method of claim 1, wherein classifying the respective user filter as the unsafe user filter comprises:
determining that the respective user filter returns an error; and
based on determining that the respective user filter returns an error, updating an allowlist that lists safe user filters.

10. A system comprising:
data processing hardware; and
memory hardware in communication with the data processing hardware, the memory hardware storing instructions that when executed on the data processing hardware cause the data processing hardware to perform operations comprising:
receiving, via a network, a database query from a user device associated with a user, the database query requesting a database to conditionally return one or more rows stored at the database, the database query characterizing multiple user filters, each user filter of the multiple user filters filtering rows from the database;
determining that a security filter restricts the user from accessing at least one row of the database;
for each respective user filter of the multiple user filters, classifying the respective user filter as one of:
a safe user filter representing a user filter that, when executed, is incapable of reporting an error that leaks information from the at least one row of the database; or
an unsafe user filter representing a user filter that, when executed, is capable of reporting an error that leaks information from the at least one row of the database;
determining a filter execution order of the multiple user filters and the security filter based on the classified multiple user filters, the filter execution order ensuring no errors leak information from the at least one row of the database;
optimizing the filter execution order to minimize query latency while ensuring no errors leak information from the at least one row of the database, wherein optimizing the filter execution order comprises:
placing at least one of the respective user filters classified as the safe user filter earlier in the filter execution order than the security filter; and
placing each of the respective user filters classified as the unsafe user filter later in the filter execution order than the security filter;
executing, using the optimized filter execution order, the multiple user filters and the security filter; and
returning, via the network, the one or more rows to the user device.

11. The system of claim 10, wherein the database query comprises a Structured Query Language (SQL) query.

12. The system of claim 10, wherein classifying the respective user filter as the safe user filter comprises determining that the respective user filter comprises a comparison filter.

13. The system of claim 10, wherein classifying the respective user filter as the unsafe user filter comprises determining that the respective user filter comprises a division operation.

14. The system of claim 10, wherein classifying the respective user filter as the safe user filter comprises:
determining the respective user filter comprises the unsafe user filter;
determining the respective user filter has an equivalent safe user filter; and
translating the respective user filter to the equivalent safe user filter.

15. The system of claim 14, wherein the equivalent safe user filter returns a NULL.

16. The system of claim 10, wherein the operations further comprise extracting, from the database query, the multiple user filters using conjunctive-normalized forms.

17. The system of claim 10, wherein classifying the respective user filter comprises referencing an allowlist.

18. The system of claim 10, wherein classifying the respective user filter as the unsafe user filter comprises:
determining that the respective user filter returns an error; and
based on determining that the respective user filter returns an error, updating an allowlist that lists safe user filters.

* * * * *